United States Patent
Martinez

(10) Patent No.: US 10,076,838 B1
(45) Date of Patent: Sep. 18, 2018

(54) MULTI-AXIS SUPPORT CART

(71) Applicant: Gulfstream Aerospace Corporation, Savannah, GA (US)

(72) Inventor: Jose Antonio Martinez, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/650,691

(22) Filed: Jul. 14, 2017

(51) Int. Cl.
| | |
|---|---|
| *B62H 5/00* | (2006.01) |
| *B25H 5/00* | (2006.01) |
| *B62B 3/02* | (2006.01) |
| *B62B 3/10* | (2006.01) |
| *B64F 5/10* | (2017.01) |
| *H01B 13/012* | (2006.01) |

(52) U.S. Cl.
CPC .............. *B25H 5/00* (2013.01); *B62B 3/02* (2013.01); *B62B 3/10* (2013.01); *B64F 5/10* (2017.01); *H01B 13/012* (2013.01); *B62B 2202/48* (2013.01); *B62B 2203/071* (2013.01); *B62B 2203/073* (2013.01); *B62B 2206/06* (2013.01)

(58) Field of Classification Search
CPC .... B25H 5/00; B64F 5/10; B62B 3/02; B62B 3/10; B62B 2202/48; B62B 2203/071; B62B 2203/073; B62B 2206/06
See application file for complete search history.

(56) References Cited

U.S. PATENT DOCUMENTS

| | | | |
|---|---|---|---|
| 2003/0155730 A1* | 8/2003 | Chu .................... | B62B 3/02 280/47.35 |
| 2007/0018433 A1* | 1/2007 | Sinnamon ............ | A61G 12/001 280/651 |
| 2012/0212116 A1* | 8/2012 | McRorie ................... | B62B 3/02 312/249.13 |
| 2013/0200579 A1* | 8/2013 | Abernethy ................ | B62B 3/02 280/6.15 |
| 2014/0238799 A1* | 8/2014 | Sharma ................... | B62B 1/125 190/11 |
| 2015/0105660 A1* | 4/2015 | Ninomiya ................ | B62B 3/02 600/437 |
| 2015/0227127 A1* | 8/2015 | Miller ................... | G05B 19/042 700/244 |
| 2015/0342562 A1* | 12/2015 | Messina ............... | A61B 8/4405 248/544 |
| 2016/0167688 A1* | 6/2016 | Jones ......................... | B62B 3/16 280/651 |
| 2017/0099954 A1* | 4/2017 | Chao ..................... | A47C 9/027 |

* cited by examiner

*Primary Examiner* — Erez Gurari
(74) *Attorney, Agent, or Firm* — LKGlobal | Lorenz & Kopf, LLP

(57) ABSTRACT

A multi-axis support cart includes a base having a longitudinal axis and a second axis defining a first plane with wheels coupled to the base facilitating movement of the base along the first plane. Coupled to the base is at least one telescoping riser extending along a third axis orthogonal to the first plane. A support surface is coupled to the at least one telescoping riser and configured on a second plane parallel to the first plane with a piston coupled between the base and the support surface facilitating movement of the support surface along the third axis. A turntable coupled to the support surface receives a device/tool and provides rotational movement for the device/tool about the third axis.

18 Claims, 6 Drawing Sheets

MULTI-AXIS SUPPORT CART

TECHNICAL FIELD

The present invention relates generally to a support carts and more particularly to a device (e.g., tool) support cart providing multiple axes of movement of the tool supported by the support cart.

BACKGROUND

Contemporary business aircraft literally include miles/kilometers of wire most of which is organized into cables and wiring harnesses. Typically, wiring harnesses are pre-assembled on near-vertical wire harness template boards promoting repeatable assembly and facilitating inspection. After the individual wires forming the wiring harness are set into place, each end of each wire must have a portion of the wire insulation removed (known as "wire stripping") and a connector press-fit (or "crimped") onto the exposed metal conductor of the wire. Using hand tools for these repeated operations is tiring for the technician and may not lead to consistent stripping and crimping results. Conversely, using automated tools promotes consistency and uniform results, however, automated tools are more bulky and heavy than hand tools to correctly position and operate given that one hand of the technician must hold and position a wire, while the other hand holds and operates the tool.

Accordingly, it is desirable to provide a solution for assembling wiring harnesses that supports automated tool usage providing consistent and uniform results in the finished wire harness. It is further desirable that technician fatigue be reduced while affording greater ease of operation. Furthermore, other desirable features and characteristics will become apparent from the subsequent detailed description and the appended claims, taken in conjunction with the accompanying drawings and the foregoing technical field and background.

BRIEF SUMMARY

Various non-limiting embodiments of a multi-axis support cart are disclosed herein.

In a first non-limiting embodiment, the multi-axis support cart includes, but is not limited to, a base having a longitudinal axis and a second axis defining a first plane with wheels (e.g., casters) coupled to the base facilitating movement of the base along the first plane. Coupled to the base is at least one telescoping riser extending along a third axis orthogonal to the first plane. A support surface is coupled to the at least one telescoping riser and configured on a second plane parallel to the first plane with a piston coupled between the base and the support surface facilitating movement of the support surface along the third axis. A turntable coupled to the support surface receives a device (e.g., tool) and provides rotational movement for the device about the third axis.

In another non-limiting embodiment, the multi-axis support cart includes a substantially rectangular base having a longitudinal axis and a second axis defining a first plane with wheels (e.g., casters) coupled to the substantially rectangular base near corners of the substantially rectangular base to facilitate movement of the substantially rectangular base along the first plane. A pair of telescoping risers are coupled to the substantially rectangular base and extending along a vertical axis orthogonal to the first plane. A support surface is coupled to the pair of telescoping risers, the support surface configured on a second plane parallel to the first plane with a piston coupled between the substantially rectangular base and the support surface facilitating movement of the support surface along the vertical axis. A turntable is coupled to the support surface for receiving a device (e.g., tool) and providing rotation for the device about the vertical axis while one or more sliding members between the support surface and the turntable facilitating movement of the turntable on an axis parallel to the longitudinal axis of the substantially rectangular base while allowing the turntable to rotate about an axis parallel to the vertical axis.

BRIEF DESCRIPTION OF THE DRAWINGS

The present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims.

A multi-axis support cart is disclosed herein. The multi-axis support cart includes a base that may be moved along a plane parallel to the floor or other surface via wheels (e.g., casters). The multi-axis support cart also includes a support surface that may be raised and lowered relative to the base along a vertical axis orthogonal to the floor via a piston. A turntable is coupled to the support surface for receiving a device (e.g., tool) and allows for rotation of the device about the vertical axis. In one embodiment, the turntable is also slidable along an axis parallel to the floor facilitating movement of the tool toward or away from a wiring harness template board. The multi-axis tool support cart promotes safety, reduces technician fatigue and provides consistent and uniform results when manufacturing a wiring harness.

A greater understanding of the multi-axis support cart may be obtained through a review of the illustrations accompanying this application together with a review of the detailed description that follows.

Figure 1:
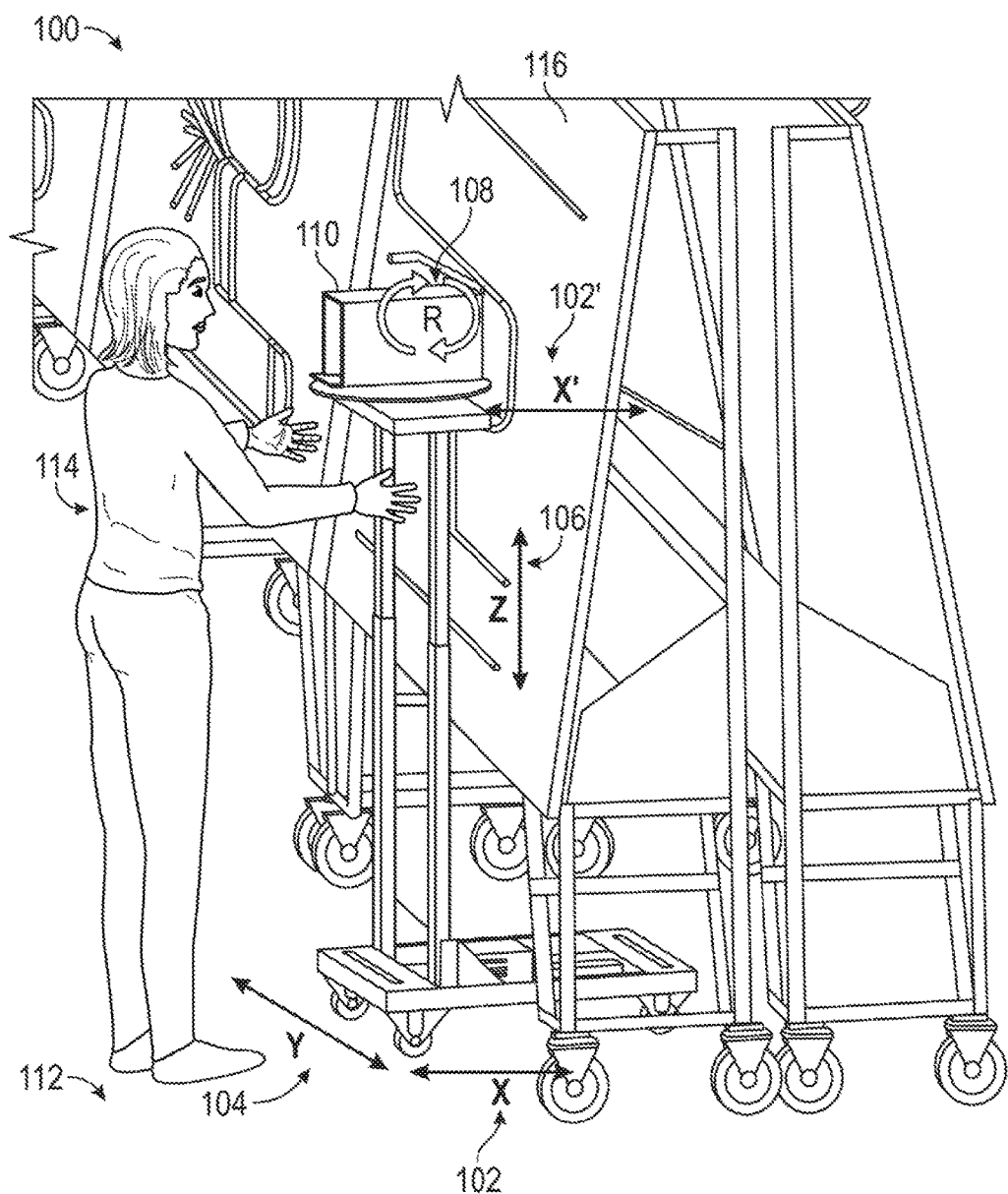
FIG. 1 is an illustration of a multi-axis support cart in accordance with one non-limiting implementation.

FIG. 1 is an illustration of a multi-axis support cart 100 operating in a non-limiting application. As its name suggests, the multi-axis support cart 100 moves or positions a device (e.g., tool) along multiple axes to facilitate positioning and use of the device/tool. In non-limiting embodiments, the multi-axis support cart 100 includes movement along an X axis 102, a Y axis 104 and a vertical or Z axis 106. The X axis 102 and Y axis 104 define a plane (the X-Y plane) in which the base of the multi-axis support cart 100 moves parallel to a floor 112. The tool (in this embodiment) 110 is supported by a turntable enabling the tool 110 to rotate about the third (vertical or Z) axis 106 as shown by rotational (R) axis 108. The turntable is also slidable along an X' axis 102' allowing a technician 114 to position the tool 110 relative to a wiring harness board 116 for use in manufacturing a wiring harness.

Figure 2A:
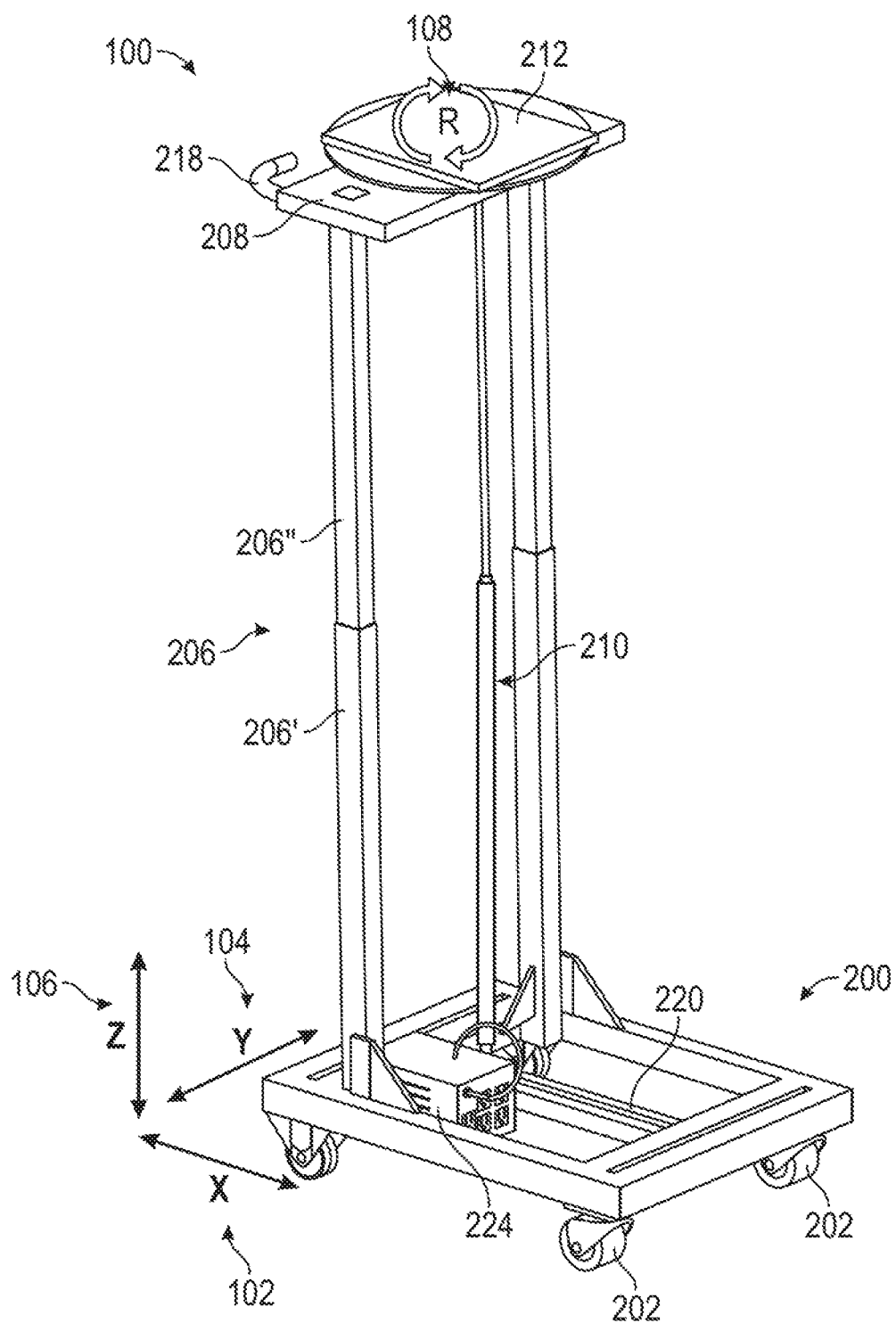
FIGS. 2A-B are front perspective views of a multi-axis support cart in accordance with one non-limiting implementation.
Figure 2B:
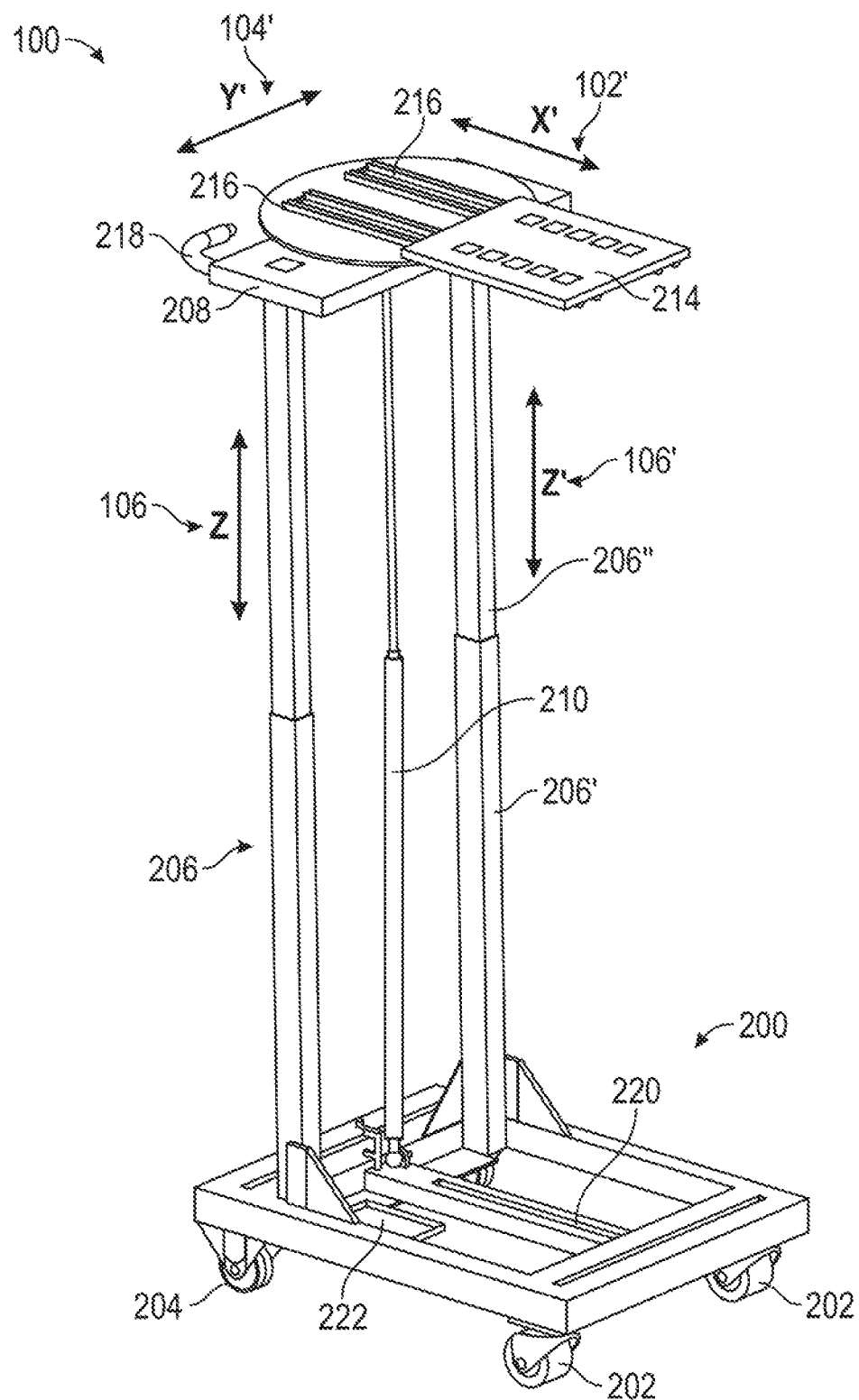
Figure 3A:
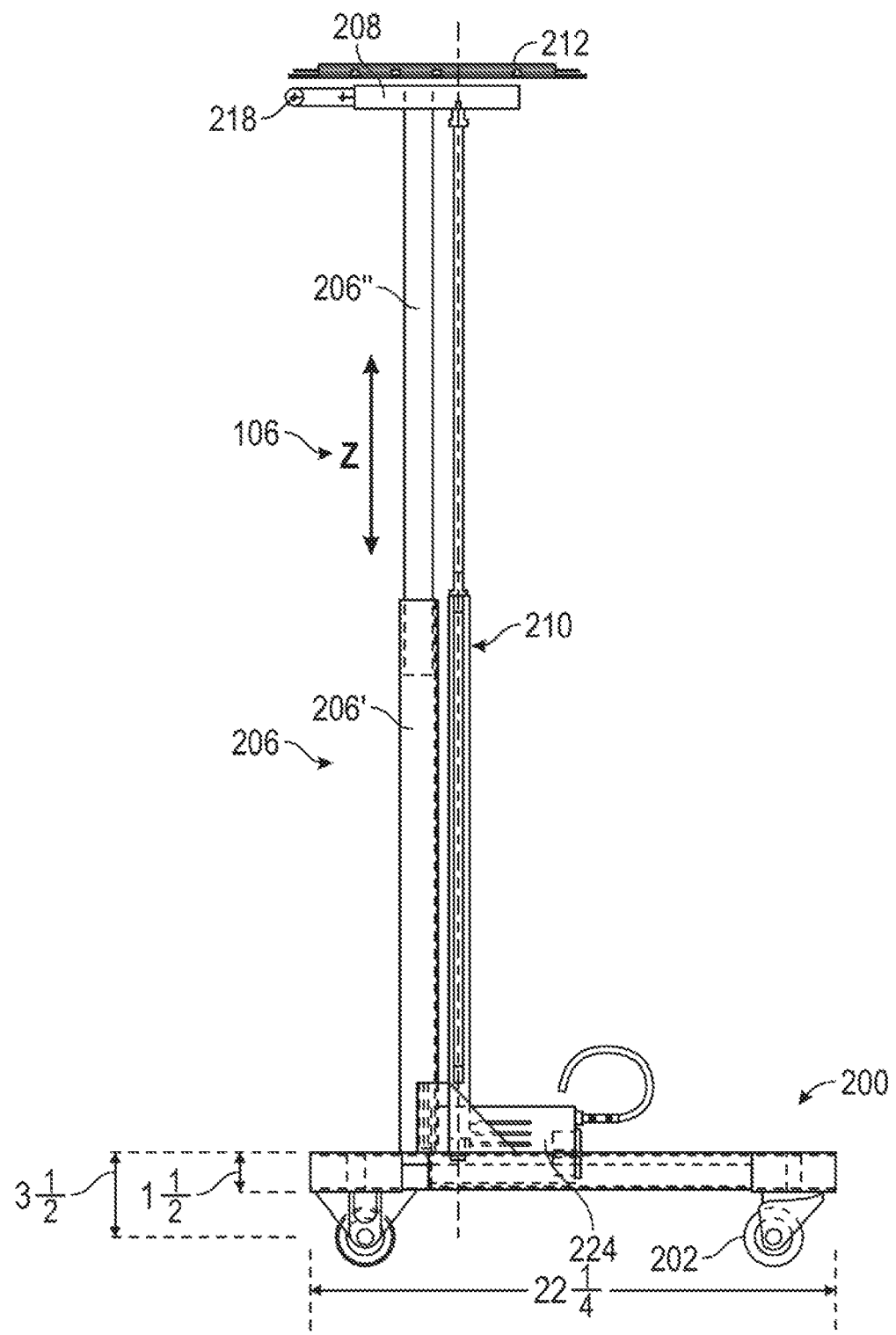
FIGS. 3A-B are side views of a multi-axis support cart in accordance with one non-limiting implementation.
Figure 3B:
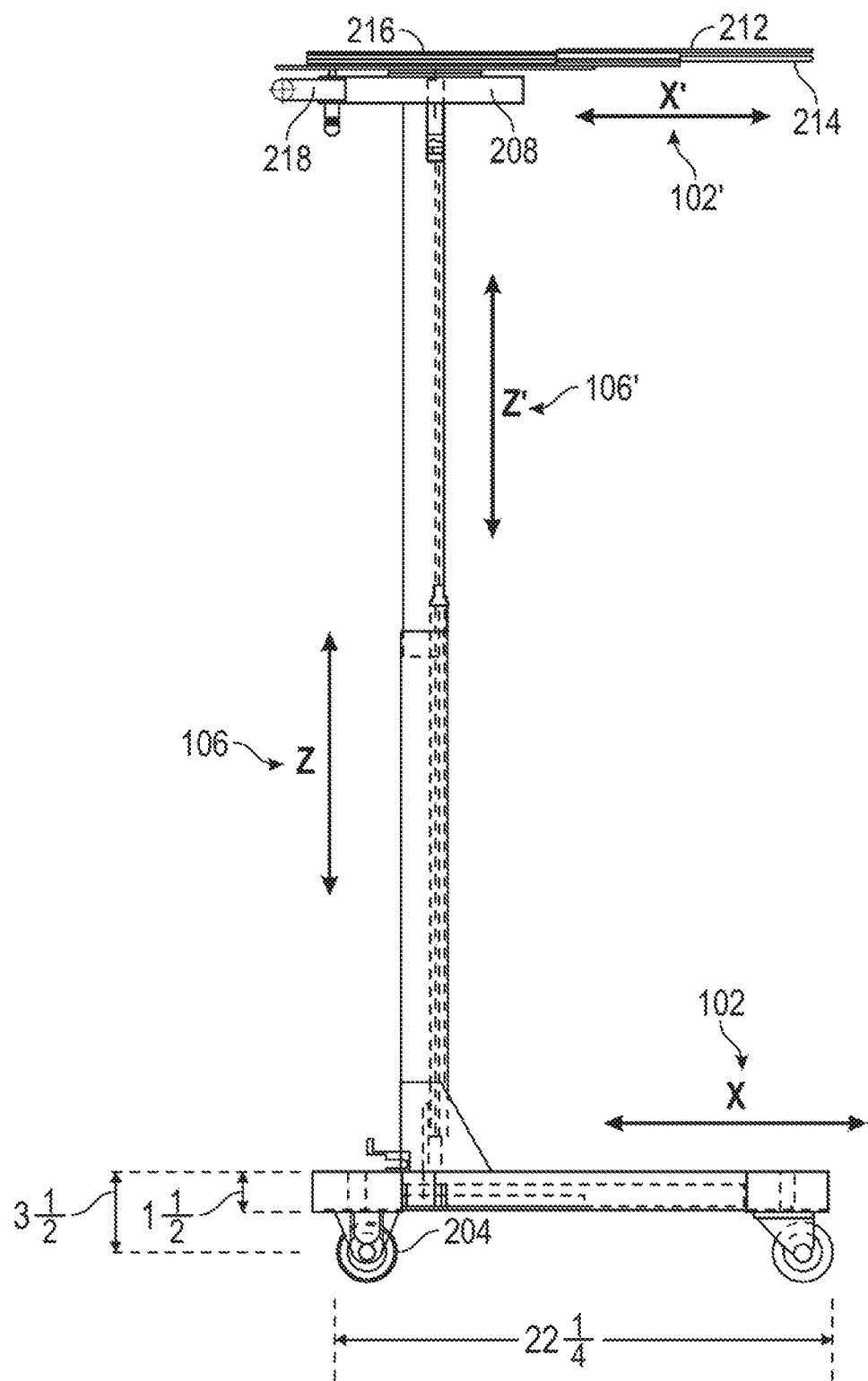
Figure 4:
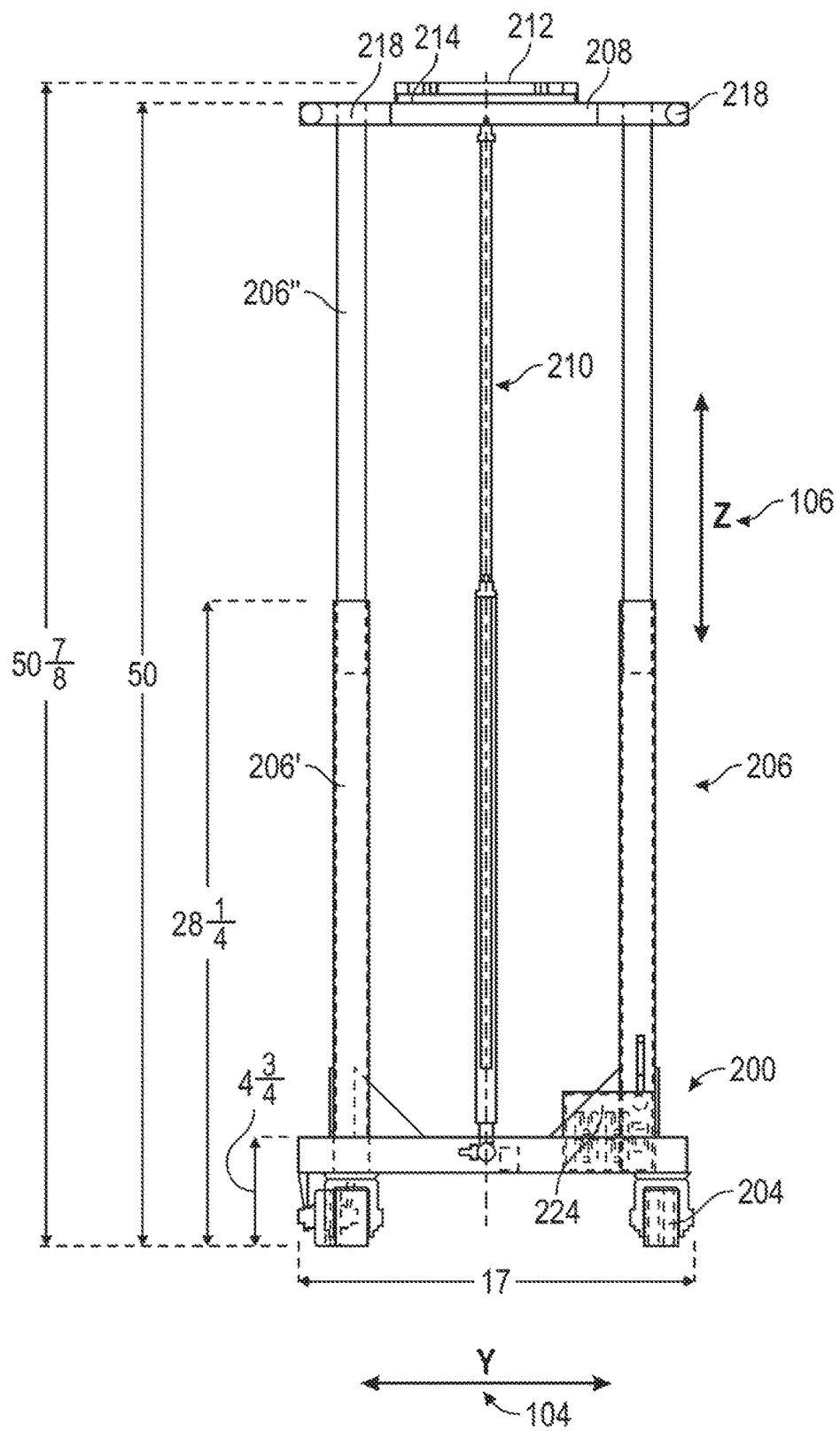
FIG. 4 is a rear view of a multi-axis support cart in accordance with one non-limiting implementation.

With continued reference to FIG. 1, FIGS. 2A-B are front perspective illustrations of a non-limiting embodiment of the multi-axis support cart 100. The multi-axis support cart 100 includes a base 200 that in some embodiments has a substantially rectangular configuration. The base 200 is configured along a longitudinal (X) axis 102 and a second (Y) axis 104 that define a first plane (the X-Y plane) in which the base 200 moves along a floor or other surface via wheels or casters 202 and 204. In some embodiments, casters 202 are locking casters, while casters 204 are fixed casters. In some embodiments, it may be convenient to position the four casters position near the corners of the base 200. The multi-axis support cart 100 includes at least one (two illustrated) telescoping riser 206 coupled between the base 200 and a support surface 208. The telescoping risers 206 include a first portion 206' coupled to the base 200 and a second portion 206" coupled to the support surface 208 and slidably engaging the first portion 206'. In exemplary embodiments, the support surface 208 is configured in a second plane (the X'-Y' or 102'-104' plane) that is parallel to the first plane (the X-Y or 102-104 plane). A piston 210 facilitates movement of the support surface 208 toward or away from the base 200 along a vertical (Z) axis 106 that is orthogonal to the first plane (X-Y plane) two vertically position the tool for use. A turntable 212 is coupled to the support surface 208 and provides for rotation of the device/tool about the vertical (Z) axis 106 as illustrated by the rotational (R) axis 108. To provide transverse as well as rotational movement of the device/tool, the turntable 212 is coupled to the support surface 208 via a turntable mounting plate 214 that is coupled to sliding members 216 attached to the support surface 208. The sliding member 216 facilitates movement of the turntable 212 along an X' axis 102 without the need for the technician to move the base 200 along the X axis 102. As will be appreciated, as the turntable 212 moves along the X' axis 102' the rotational (R) axis 108 will translate to rotate about a vertical Z' axis 106' that is parallel to the vertical Z axis 106.

To facilitate movement of the multi-axis support cart 100 along the first plane, one or more handles 218 may be coupled to the support surface 208 for use by the technician. In some embodiments, the base 200 includes a central support number 220 positioned centrally in the base and parallel to the longitudinal X axis 102 and may be used in some embodiments to support or provide a mounting surface for the piston 210. Additionally, some embodiments include a power supply support number 212 coupled to the base for supporting a power supply 224 that provides power to the tool (110 in FIG. 1).

Accordingly, in fundamental embodiments, the multi-axis support cart 100 facilitates positioning a device/tool along a first (X-Y) plane, then vertically positioning the tool by the piston 210 and telescoping risers 206, and finally, aligning the tool for operation via the turntable 212 and sliding members 216. At all times, the weight of the device/tool is supported by the multi-axis support cart 100 facilitating the use of automated tools that may be heavier and bulkier than hand tools. In this way, the multi-axis support cart promotes safety, reduces technician fatigue and provides consistent and uniform results when manufacturing a wiring harness or for other tool operations as will be appreciated by those skilled in the art.

With continued reference to FIG. 1 and FIGS. 2A-B, FIGS. 3A-B and FIG. 4 are dimensioned side views and rearview (respectively) drawings providing one non-limiting example of a multi-axis support cart 100 in accordance with disclosed embodiments. As will be appreciated, the exemplary dimensions provided in FIGS. 3A-B and FIG. 4 may be modified proportionally or selectively to provide a multi-axis tool support cart for any particular implementation. While the multi-axis support cart 100 has been described in the exemplary context of an aircraft wire harness assembly, it will be appreciated that the multi-axis tool support cart 100 may find utility in any number of applications.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-axis support cart, comprising:
   a base having a longitudinal axis and a second axis defining a first plane;
   wheels coupled to the base, the wheels facilitating movement of the base along the first plane;
   at least one telescoping riser coupled to the base and extending along a third axis orthogonal to the first plane;
   a support surface coupled to the at least one telescoping riser, the support surface occupying a second plane parallel to the first plane;
   a piston coupled between the base and the support surface facilitating movement of the support surface along the third axis;
   a turntable coupled to the support surface via a turntable mounting plate for receiving a device, the turntable providing rotational movement for the device about the third axis; and
   sliding members between the support surface and the turntable mounting plate facilitating movement of the turntable on an axis parallel to the longitudinal axis of the base while allowing the turntable to rotate about an axis parallel to the third axis.

2. The multi-axis support cart of claim 1, wherein the base has a substantially rectangular configuration.

3. The multi-axis support cart of claim 2, where the wheels comprise four casters one near each corner of the substantially rectangular base.

4. The multi-axis support cart of claim 1, further comprising a central support member positioned in the base parallel to the longitudinal axis.

5. The multi-axis support cart of claim 1, further comprising a power supply support member for receiving power supply to provide power to the device.

6. The multi-axis support cart of claim 5, further comprising a power supply positioned on the power supply support member.

7. The multi-axis support cart of claim 1, further comprising handles on the support surface facilitating movement of the base along the first plane.

8. The multi-axis support cart of claim 1, wherein the at least one telescoping riser comprises a first portion coupled to the base and a second portion slideably coupled to the first portion and to the support surface.

9. A multi-axis support cart, comprising:
- a substantially rectangular base having a longitudinal axis and a second axis defining a first plane;
- wheels coupled to the substantially rectangular base near corners of the substantially rectangular base, the wheels facilitating movement of the substantially rectangular base along the first plane;
- a pair of telescoping risers coupled to the substantially rectangular base and extending along a vertical axis orthogonal to the first plane;
- a support surface coupled to the pair of telescoping risers, the support surface occupying a second plane parallel to the first plane;
- a piston coupled between the substantially rectangular base and the support surface facilitating movement of the support surface along the vertical axis or an axis parallel to the vertical axis;
- a turntable coupled to the support surface via a turntable mounting plate for receiving a device, the turntable providing rotation for the device about the vertical axis; and
- sliding members between the support surface and the turntable mounting plate facilitating movement of the turntable on an axis parallel to the longitudinal axis of the substantially rectangular base while allowing the turntable to rotate about an axis parallel to the vertical axis.

10. The multi-axis support cart of claim 9, further comprising a central support member positioned in the base parallel to the longitudinal axis.

11. The multi-axis support cart of claim 9, further comprising a power supply support member for receiving power supply to provide power to the device.

12. The multi-axis support cart of claim 11, further comprising a power supply positioned on the power supply support member.

13. The multi-axis support cart of claim 9, further comprising handles on the support surface facilitating movement of the base along the first plane.

14. The multi-axis support cart of claim 9, wherein the at least one telescoping riser comprises a first portion coupled to the substantially rectangular base and a second portion slideably coupled to the first portion and to the support surface.

15. A multi-axis support cart, comprising:
- a substantially rectangular base having a longitudinal axis and a second axis defining a first plane;
- wheels coupled to the substantially rectangular base near corners of the substantially rectangular base, the wheels facilitating movement of the substantially rectangular base along the first plane;
- a pair of telescoping risers coupled to the substantially rectangular base and extending along a vertical axis orthogonal to the first plane;
- a support surface coupled to the pair of telescoping risers, the support surface occupying a second plane parallel to the first plane;
- a piston coupled between the substantially rectangular base and the support surface facilitating movement of the support surface along the vertical axis;
- a turntable coupled to the support surface for receiving a device, the turntable providing rotation for the device about the vertical axis or an axis parallel to the vertical axis; and
- one or more sliding members between the support surface and the turntable facilitating movement of the turntable on an axis parallel to the longitudinal axis of the substantially rectangular base while allowing the turntable to rotate about an axis parallel to the vertical axis.

16. The multi-axis support cart of claim 15, further comprising a central support member positioned in the base parallel to the longitudinal axis.

17. The multi-axis support cart of claim 15, further comprising a power supply support member for receiving power supply to provide power to the device.

18. The multi-axis support cart of claim 15, further comprising handles on the support surface facilitating movement of the substantially rectangular base along the first plane.

* * * * *